(12) United States Patent
Flores et al.

(10) Patent No.: US 10,091,355 B2
(45) Date of Patent: Oct. 2, 2018

(54) VIRTUAL VOICE RESPONSE AGENT INDIVIDUALLY CONFIGURED FOR A USER

(71) Applicant: International Business Machines Corporation, Armonk, NY (US)

(72) Inventors: Romelia H. Flores, Keller, TX (US); Christian E. Loza, Denton, TX (US); Olivia G. Loza, Denton, TX (US); John S. Pannell, Keller, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 15/048,679

(22) Filed: Feb. 19, 2016

(65) Prior Publication Data

US 2017/0244834 A1    Aug. 24, 2017

(51) Int. Cl.
*H04M 3/493* (2006.01)
*H04M 3/42* (2006.01)
*H04M 1/64* (2006.01)

(52) U.S. Cl.
CPC ......... *H04M 3/4936* (2013.01); *H04M 1/645* (2013.01); *H04M 3/42068* (2013.01)

(58) Field of Classification Search
CPC ............. H04M 3/5183; H04M 3/5166; H04M 2203/355; H04M 3/42059; H04M 3/493; H04M 3/4936; H04M 3/42068; H04M 1/645
See application file for complete search history.

(56) References Cited

U.S. PATENT DOCUMENTS

| | | | |
|---|---|---|---|
| 6,885,737 B1 * | 4/2005 | Gao | H04M 3/493 370/352 |
| 7,184,540 B2 | 2/2007 | Dezonno et al. | |
| 7,515,695 B1 * | 4/2009 | Chan | H04M 3/493 379/221.09 |
| 8,195,668 B2 | 6/2012 | Drennan et al. | |
| 8,548,153 B2 * | 10/2013 | Pearson | H04M 1/2478 379/211.02 |
| 8,549,061 B2 | 10/2013 | Rao et al. | |
| 8,595,257 B1 | 11/2013 | Ovide | |
| 8,661,112 B2 * | 2/2014 | Creamer | H04M 3/42059 379/88.16 |
| 8,788,307 B2 | 7/2014 | Wright et al. | |
| 8,837,687 B2 | 9/2014 | Odinak et al. | |
| 8,867,733 B1 | 10/2014 | Conway et al. | |
| 8,996,429 B1 | 3/2015 | Francis, Jr. et al. | |

(Continued)

*Primary Examiner* — Lisa Hashem
(74) *Attorney, Agent, or Firm* — Cuenot, Forsythe & Kim, LLC

(57) ABSTRACT

A call can be received from a user. At least one input can be received from the user. Responsive to receiving the input(s) from the user, a user profile for the user can be identified or created. The user profile can indicate one or more speech traits of the user. A virtual intelligent voice response (VIVR) agent individually configured for the user can be identified or created. The VIVR agent can be configured to include, or identify, one or more VIVR agent features corresponding to the speech trait(s) of the user. The user can be interacted with on the call by generating synthesized speech using parameters specified by the VIVR agent feature(s) included in, or identified by, the VIVR agent individually configured for the user.

20 Claims, 4 Drawing Sheets

(56) References Cited

U.S. PATENT DOCUMENTS

| | | | |
|---|---|---|---|
| 9,147,296 B2 | 9/2015 | Ricci | |
| 9,147,297 B2 | 9/2015 | Ricci | |
| 2002/0022986 A1* | 2/2002 | Coker | G06Q 30/02 717/115 |
| 2006/0093097 A1* | 5/2006 | Chang | H04M 3/5183 379/88.01 |
| 2007/0208570 A1* | 9/2007 | Bhardwaj | H04M 3/51 704/270.1 |
| 2008/0304639 A1* | 12/2008 | McDonough | H04M 3/493 379/93.01 |
| 2010/0020959 A1 | 1/2010 | Spottiswoode | |
| 2013/0156168 A1* | 6/2013 | Lingam | H04M 1/72563 379/88.16 |
| 2014/0140496 A1 | 5/2014 | Ripa et al. | |
| 2014/0270133 A1* | 9/2014 | Conway | H04M 3/5233 379/265.1 |
| 2014/0314225 A1* | 10/2014 | Riahi | G06Q 30/02 379/265.09 |
| 2015/0169336 A1* | 6/2015 | Harper | G10L 15/22 715/706 |
| 2015/0358463 A1* | 12/2015 | O'Connor | H04M 3/5166 379/88.02 |
| 2016/0119478 A1* | 4/2016 | Sharpe | H04M 3/5232 379/265.09 |

* cited by examiner

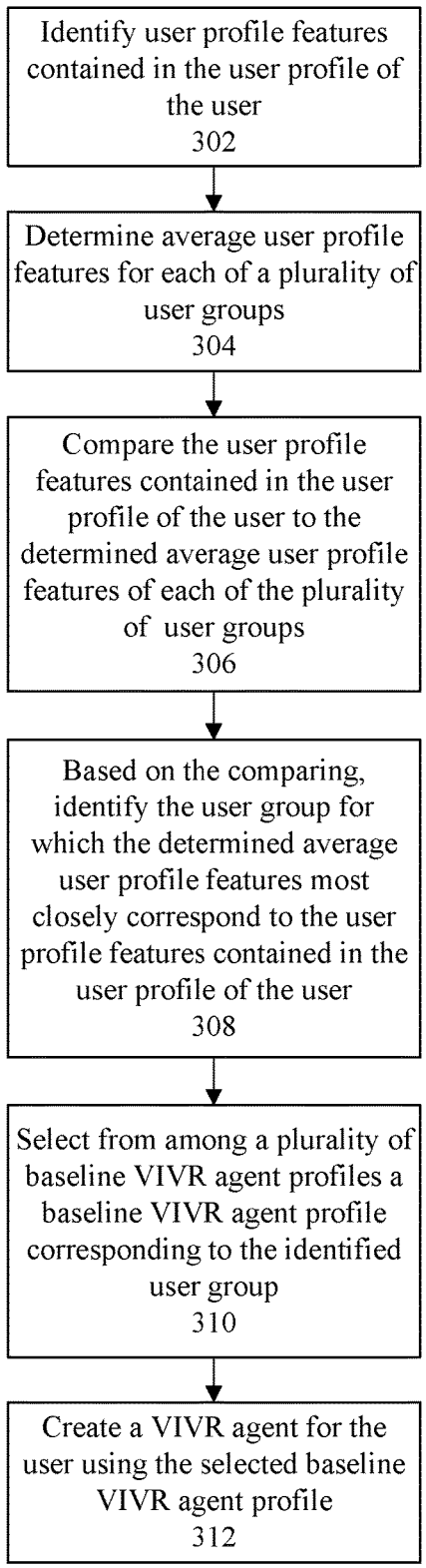
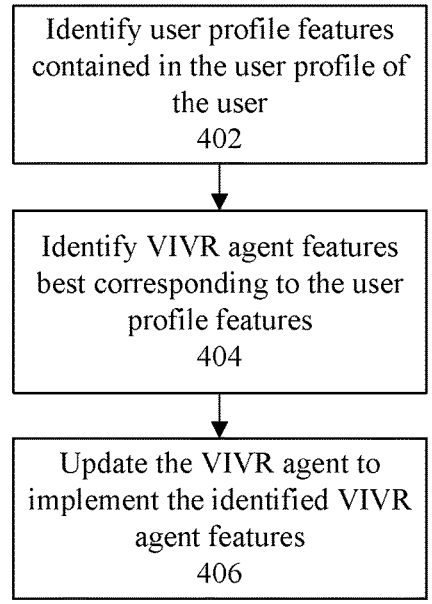
FIG. 3
FIG. 4

US 10,091,355 B2

VIRTUAL VOICE RESPONSE AGENT INDIVIDUALLY CONFIGURED FOR A USER

BACKGROUND

The present invention relates to interactive voice response systems.

Businesses and other organizations sometimes use interactive voice response (IVR) systems, also known as intelligent voice response systems, to field various types of calls, for example calls from customers. An IVR system allows customers to interact with a company's host system via voice or multi-frequency signaling inputs (e.g., Touch-Tone), after which they can service their own inquiries by following an IVR dialogue presented by the IVR system. IVR systems can respond with prerecorded or dynamically generated audio to further direct users on how to proceed. IVR applications can be used to control functions where the interface can be broken down into a series of simple interactions. IVR systems deployed in a network typically are sized to handle large call volumes.

IVR systems are typically intended to reduce cost and improve customer experience. Examples of typical IVR applications are telephone banking systems, credit card services, customer contact systems, and the like. Further, companies also use IVR services to extend their business service hours. The use of IVR allows callers' queries to be resolved without the need for queueing and incurring the cost of a live agent. If callers do not find the information they need or require further assistance, then their calls can be transferred to a live agent. This makes for a more efficient system in which live agents have more time to deal with complex interactions. The live agents need not deal with basic inquiries that require yes/no responses or obtaining standard customer information.

SUMMARY

A method includes receiving a first call from a user. The method also can include receiving at least a first input received from the user on the first call. The method also can include, responsive to receiving at least the first input from the user on the first call, identifying or creating a user profile for the user, the user profile indicating at least a first speech trait of the user. The method also can include, responsive to identifying or creating the user profile for the user, automatically identifying or creating, using a processor, a virtual intelligent voice response (VIVR) agent individually configured for the user, the VIVR agent configured to include, or identify, at least a first VIVR agent feature corresponding to at least a first speech trait of the user. The method also can include interacting with the user on the first call by generating first synthesized speech using parameters specified by at least the first VIVR agent feature included in, or identified by, the VIVR agent individually configured for the user.

A system includes a processor programmed to initiate executable operations. The executable operations include receiving a first call from a user. The executable operations also can include receiving at least a first input from the user on the first call. The executable operations also can include, responsive to receiving at least the first input from the user on the first call, identifying or creating a user profile for the user, the user profile indicating at least a first speech trait of the user. The executable operations also can include, responsive to identifying or creating the user profile for the user, automatically identifying or creating a virtual intelligent voice response (VIVR) agent individually configured for the user, the VIVR agent configured to include, or identify, at least a first VIVR agent feature corresponding to at least a first speech trait of the user. The executable operations also can include interacting with the user on the first call by generating first synthesized speech using parameters specified by at least the first VIVR agent feature included in, or identified by, the VIVR agent individually configured for the user.

A computer program includes a computer readable storage medium having program code stored thereon. The program code is executable by a processor to perform a method. The method includes receiving, by the processor, a first call from a user. The method also can include receiving, by the processor, at least a first input received from the user on the first call. The method also can include, responsive to receiving at least the first input from the user on the first call, identifying or creating, by the processor, a user profile for the user, the user profile indicating at least a first speech trait of the user. The method also can include, responsive to identifying or creating the user profile for the user, automatically identifying or creating, by the processor, a virtual intelligent voice response (VIVR) agent individually configured for the user, the VIVR agent configured to include, or identify, at least a first VIVR agent feature corresponding to at least a first speech trait of the user. The method also can include interacting, by the processor, with the user on the first call by generating first synthesized speech using parameters specified by at least the first VIVR agent feature included in, or identified by, the VIVR agent individually configured for the user.

BRIEF DESCRIPTION OF THE DRAWINGS

FIG. 3 is a flow chart illustrating an example of a method of creating a VIVR agent individually configured for the user.

FIG. 4 is a flow chart illustrating an example of a method of customizing a VIVR agent individually configured for the user.

DETAILED DESCRIPTION

Figure 1:
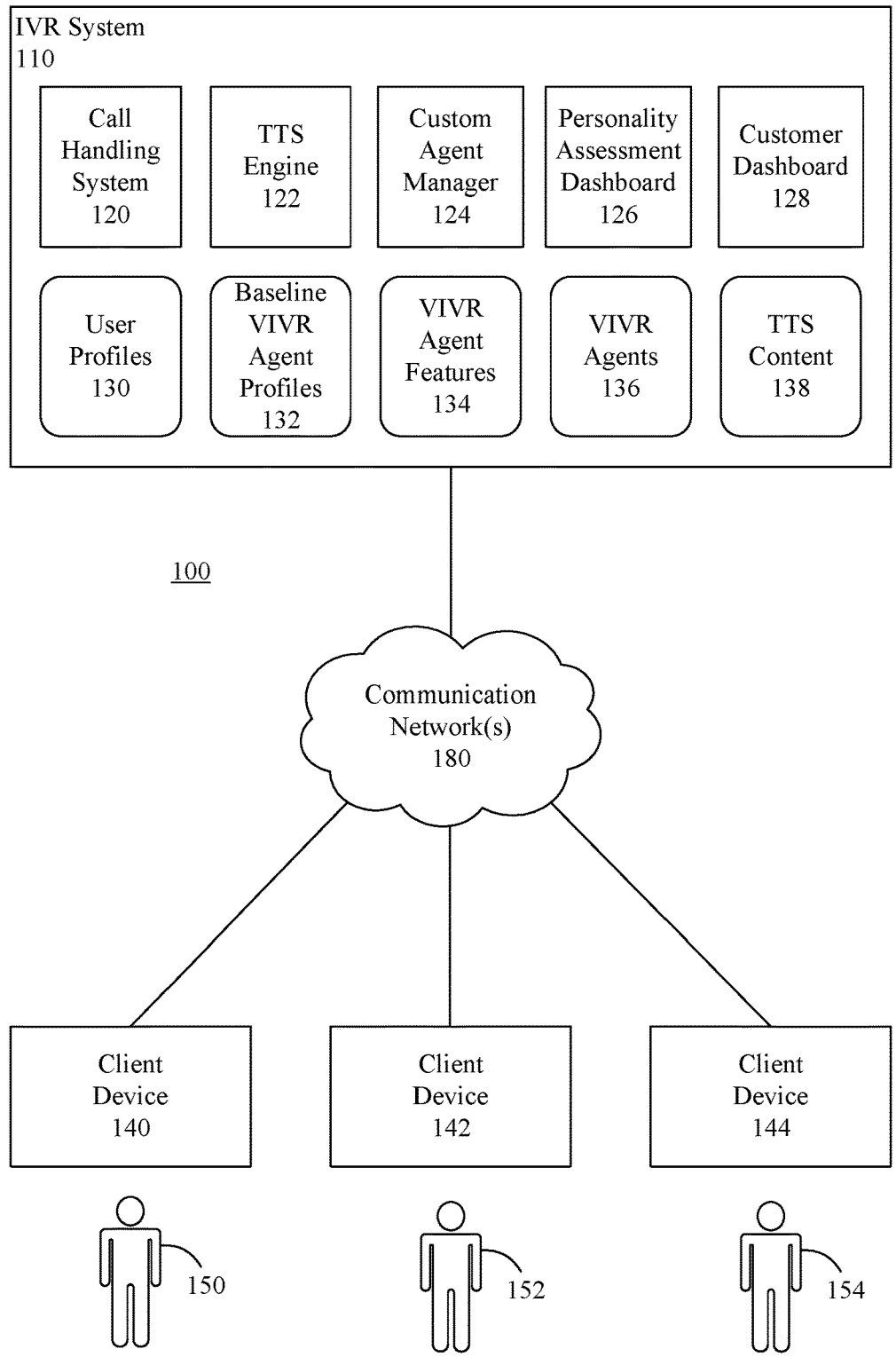
FIG. 1 is a block diagram illustrating an example of a communication system.

This disclosure relates to interactive voice response systems. In accordance with the arrangements described herein, an interactive voice response (IVR) system can receive a call from a user. Responsive to receiving user inputs from the user on the call, the IVR system can identify or create a user profile for the user. The user profile can indicate one or more speech traits of the user. Responsive to identifying or creating the user profile for the user, the IVR system can automatically identify or create a virtual intelligent voice response (VIVR) agent individually configured for the user. The VIVR agent can be configured to include, or identify, one or more VIVR agent features corresponding to the speech traits of the user. The IVR system can interact with the user on the call by generating synthesized speech using parameters specified in the VIVR agent features.

Several definitions that apply throughout this document now will be presented.

As defined herein, the term "call" means a communication session established between a client device and an interactive voice response system via which a user of the client device communicates with the interactive voice response system. A "call" may be placed by a user to the interactive voice response system using the client device, or received by a client device of a user from the interactive voice response system.

As defined herein, the term "interactive voice response system," sometimes referred to as an "intelligent voice response system" and herein also referred to as "IVR system," means a system including at least one processor and memory configured to receive calls from client devices of users and/or place calls to client devices of users and generate speech signals prompting users to generate voice and/or multi-frequency signaling inputs, and initiate one or more call handling operations responsive to the voice and/or multi-frequency signaling inputs. Such call handling operations may include, but are not limited to, generating additional speech signals containing information presented to users, receiving additional voice and/or multi-frequency signaling inputs, and routing calls.

As defined herein, the term "multi-frequency signaling input" means an input signal having a mixture of pure tone (pure sine waves) sounds generated by a user selecting a key or button of a client device. An example of a multi-frequency signaling input is a dual-tone multi-frequency signaling input (DTMF), commonly referred to as a Touch-Tone.

As defined herein, the term "live agent" means a person (i.e., a human being) who interacts with a user of an interactive voice response system on a call.

As defined herein, the term "virtual intelligent voice response agent," also referred to herein as "VIVR agent," means a functional data structure defining parameters to be used during speech synthesis to generate speech presented to a user on a call.

As defined herein, the term "virtual intelligent voice response agent individually configured for the user," also referred to herein as "VIVR agent individually configured for the user," means a virtual intelligent voice response agent specifically and exclusively configured for one particular user. In illustration, a virtual intelligent voice response agent may be specifically and automatically created for each user who interacts with an interactive voice response system while participating in calls with the interactive voice response system.

As defined herein, the term "synthesized speech" means speech signals generated using speech synthesis.

As defined herein, the term "speech synthesis" means the artificial production of human speech using at least one processor.

As defined herein, the term "speech trait" means a characteristic of a user's spoken utterances distinct from the meaning of vocabulary (e.g., words, colloquialisms, phrases and/or sentences) expressed by the spoken utterances. Examples of speech traits include, but are not limited to, a language spoken by a user, a dialect spoken by a user, a particular accent of a user's speech, a type of vocabulary used by a user, a user's speech rate or speech tempo, a gender corresponding to a user's tone of voice, a sentiment of a user (e.g., based on the user's tone of conversation and/or statements made by the user), a personality type corresponding to a user's spoken utterances, a user age or approximate user age corresponding to the user's spoken utterances (e.g., based on the user's tone of voice, speech rate or speech tempo, etc.), and a geographic region corresponding to a user's dialect or accent. Although vocabulary spoken by a user will convey one or more meanings, mere use of the vocabulary by the user, and not the meaning(s) conveyed by the vocabulary, represents a speech trait.

As defined herein, the term "client device" means a device with which a user directly interacts to communicate with an interactive voice response system using spoken utterances and/or multi-frequency signaling inputs. Examples of a client device include, but are not limited to, a telephone, a mobile phone, a smart phone, a personal digital assistant, a smart watch, smart glasses, a desktop computer, a mobile computer, a laptop computer, a netbook computer, a tablet computer, a gaming device, a set-top box and the like. Network infrastructure, such as routers, firewalls, switches, and the like, are not client devices as the term "client device" is defined herein.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a communication system 100. The communication system can include an interactive voice response (IVR) system 110 and a plurality of client device 140, 142, 144 used by respective users 150, 152, 154. The IVR system 110 can include a call handling system 120, a text-to-speech (TTS) engine 122, a custom agent manager 124, a personality assessment dashboard 126 and a customer dashboard 128. The IVR system 110 also can include user profiles 130, baseline user virtual intelligent voice response (VIVR) agent profiles 132, VIVR agent features 134, VIVR agents 136, and TTS content 138 used by the TTS engine 122 as source text for speech synthesis. The user profiles 130, baseline VIVR agent profiles 132, VIVR agent features 134, VIVR agents 136 and TTS content 138 may be stored locally within the IVR system 110 or on one or more computer-readable storage mediums communicatively linked to the IVR system 110.

The call handling system 120 can handle calls placed by the users 150-154. The TTS engine 122 can be used by the call handling system 120 to generate, from the TTS content 138, speech signals presented to the users 150-154 via the respective client devices 140-144. To generate the speech signals, the TTS engine 122 can perform linguistic analysis on the TTS content 138 using parameters specified by the VIVR agents 136 to generate phonemes, and combine the phonemes using wave form generation. In this regard, the VIVR agents 136 can specify parameters, such as phasing, intonation, duration, tempo, and various other parameters, used during linguistic analysis. Further, the VIVR agents 136 can specify parameters used to select text of the TTS content 138 upon which speech synthesis is performed for various users 150-154. The parameters specified by the VIVR agents 136 can be specified by VIVR agent features 134 included in, or identified by, the VIVR agents 136. In illustration, each VIVR agent 136 can include, or identify, VIVR agent features 134 selected for a particular user 150-154.

The custom agent manager 124 can automatically create VIVR agents 136 based on the user profiles 130 and baseline VIVR agent profiles 132, as will described. The custom agent manager 124 also can customize VIVR agents 136 based on user profiles 130 and VIVR agent features 134, which also will be described. The personality assessment dashboard 126 can provide a user interface for an administrator or live agent of the IVR system 110 to proactively specify VIVR agent features 134 for VIVR agents 136 for particular users based on interactions with the users. The customer dashboard 128 can provide a user interface for customers to select and set baseline personality traits for their VIVR agents 136. In addition, the customer dashboard 128 can provide a list of pre-defined baseline VIVR agent profiles 132 which users can select for creation of their VIVR agents 136.

The IVR system 110 can receive calls from users 150-154, using the respective client devices 140-144, via one or more communication networks 180, and implement various processes described in the following flowcharts. A communication network 180 is the medium used to provide communications links between the client devices 140-144 and the IVR system 110 connected together within the communication system 100. A communication network 180 may include connections, such as wire, wireless communication links, or fiber optic cables. A communication network 180 can be implemented as, or include, any of a variety of different communication technologies such as the Public Switched Telephone Network (PSTN), a mobile network, a wide area network (WAN), a local area network (LAN), a wireless network, a Virtual Private Network (VPN), the Internet, or the like.

Figure 2:
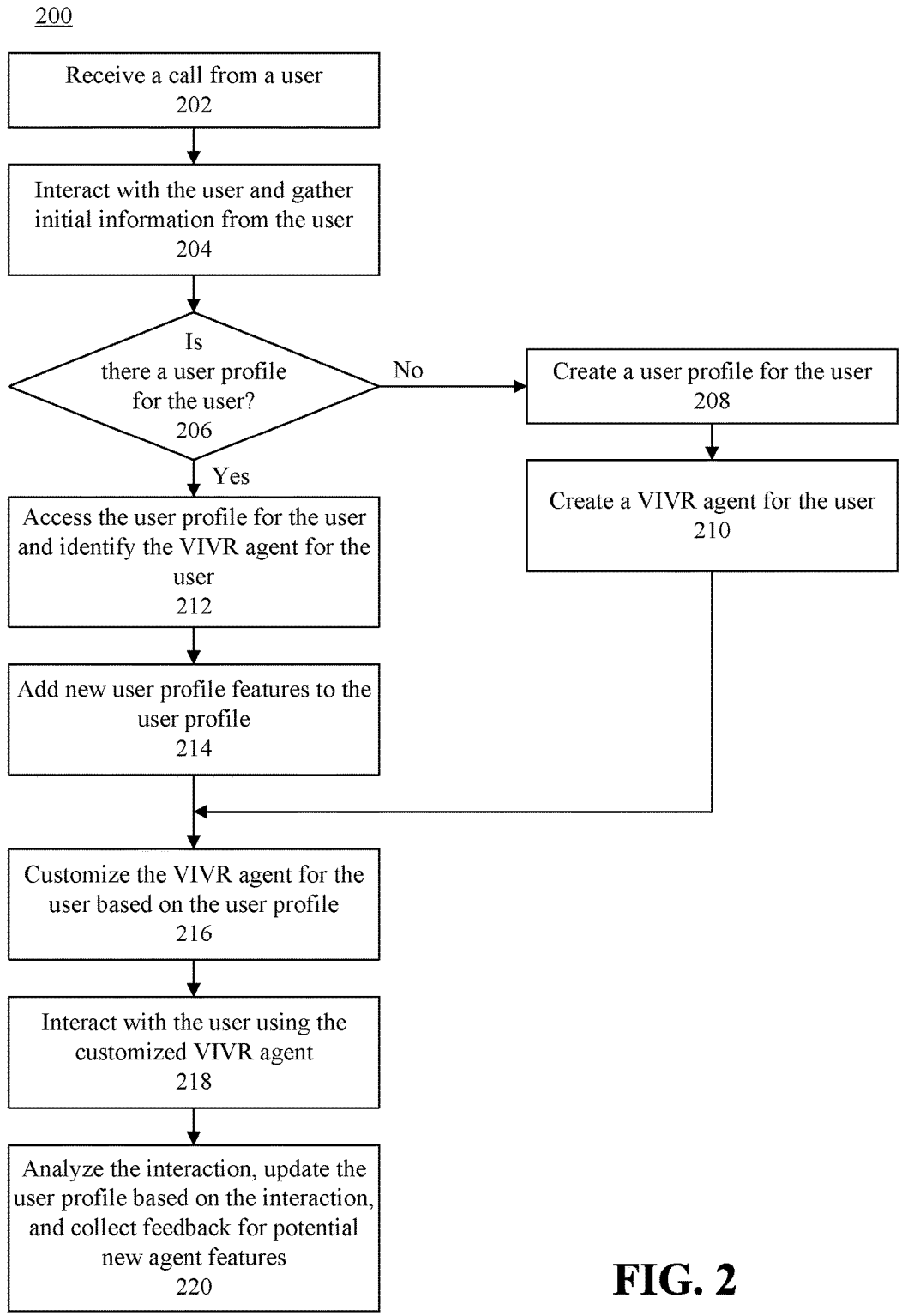
FIG. 2 is a flow chart illustrating an example of a method of interacting with a user on a call using a virtual intelligent voice response (VIVR) agent individually configured for the user.

FIG. 2 is a flow chart illustrating an example of a method 200 of interacting with a user on a call using a virtual intelligent voice response agent individually configured for the user. The method 200 can be implemented by IVR system 110 of FIG. 1 for each call that is received from a user 150-154. Accordingly, the following description of the method 200 references FIG. 1, where appropriate.

At step 202, the IVR system 110 can receive a call from a user, for example the user 150 of the client device 140. In this regard, the user 150 can place the call using the client device 140. The call handling system 120 can answer the call. At step 204, the call handling system can initiate initial interactions with the user 150. During the initial interactions, the call handling system 120 can identify at least one user identifier corresponding to the user 150. For example, the call handling system 120 can identify a telephone number, Internet protocol (IP) address and/or media access control address (MAC) address of the client device 140 from which the call is placed.

In another example, the call handling system 120 can, automatically, audibly prompt the user 150 to provide a user identifier (e.g., the user's name, the user's account number, the user's telephone number, the user's social security number, or another user identifier) by communicating the audio prompt from the IVR system 110 to the client device 140 via the communication network(s) 180. The client device 140 can present the audio prompt to the user 150 via one or more audio output transducers within or otherwise coupled to the client device 140.

The audio prompt can prompt the user 150 to enter the user identifier by providing spoken utterances and/or depressing keys or buttons. The client device 140 can detect the user's spoken utterances (via a suitable input audio transducer) and/or key or button entries and communicate corresponding signals to the IVR system 110. In the case that the user provides spoken utterances, the call handling system 120 can implement speech recognition on the signals to identify the user identifier. In the case that the user provides key or button entries that generate multi-frequency signaling inputs, the call handling system 120 can process the multi-frequency signaling inputs to identify the user identifier. In the case that the user provides ASCII key entries, the call handling system 120 can process the ASCII key entries to identify the user.

The call handling system 120 also can, automatically, audibly prompt the user 150 to provide additional information pertaining to the nature of the call using spoken utterances. In response, the user 150 can provide spoken utterances. The client device 140 can monitor for, and detect, the spoken utterances and communicate to the IVR system 110 signals corresponding to the spoken utterances. The call handling system 120 can process the signals to identify the information contained in the spoken utterances. Examples of such information include, but are not limited to, a name, a nickname, a date of birth, a month of birth, a year of birth, an address, a place of employment, etc. The call handling system 120 can store such information, at least temporarily, to a computer-readable storage medium as user profile features which may be added to an existing or newly created user profile 130 of the user 150.

In addition, based on the utterances spoken by the user 150, which may include utterances spoken to provide the user identifier and/or utterances spoken to provide the additional information, the call handling system 120 can identify one or more speech traits of the user. Examples of speech traits include, but are not limited to, a language spoken by the user 150, a dialect spoken by the user 150, a particular accent of the user's speech, vocabulary, language and colloquialisms used by the user 150, the user's speech rate or speech tempo, a gender corresponding to the user's tone of voice, a sentiment of the user 150 (e.g., based on the user's tone of conversation and/or statements made by the user), a personality type corresponding to the user's spoken utterances, an age or approximate age of the user 150 corresponding to the user's spoken utterances (e.g., based on the user's tone of voice, speech rate or speech tempo, etc.), a geographic region corresponding to the user's dialect, the user's accent and/or colloquialisms used by the user 150, etc. The call handling system 120 can store the speech traits in the user profile 130 of the user 150 (e.g., as parameters and/or attributes), at least temporarily, to the computer-readable storage medium as user profile features which may be added to an existing or newly created user profile 130 of the user 150.

To identify the information contained in the spoken utterances and speech traits of the user 150 based on the spoken utterances, the call handling system 120 can implement speech recognition, natural language processing (NLP) and/or semantic analysis on the spoken utterances. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. Additionally, other processes to identify speech traits can be based on pattern recognition, including hidden Markov models, neural networks, pattern matching, frequency estimation, mixed models and deep learning.

At decision box 206, based on the user identifier received from the user 150, the call handling system 120 can determine whether the IVR system 110 presently contains or has access to a user profile 130 for the user 150. Responsive to determining that the IVR system 110 does not presently contain or have access to a user profile 130 for the user 150, the process can proceed to step 208.

At step 208, the call handling system 120 can, in real time, automatically create a user profile 130 for the user 150. The call handling system 120 can include in the user profile 130 the user profile features stored in the computer-readable storage medium at step 204. Proceeding to step 210, the call handling system 120 can initiate the custom agent manager 124 to automatically create, in real time, a new VIVR agent 136 for the user 150 based on the user profile features. Automatic creation of the new VIVR agent 136 is described herein with reference to FIG. 3. From step 210 the process can proceed to step 216, which will be described.

Referring again to decision box 206, responsive to determining that the IVR system 110 presently contains or has access to a user profile 130 for the user 150, the process can proceed to step 212. At step 212, the call handling system 120 can automatically identify and access the user profile 130 of the user 150. The call handling system 120 also can process the user profile to automatically identify a VIVR agent 136 for the user 150 (i.e., a VIVR agent 136 individually configured for that user 150).

At step 214, the call handling system 120 can, in real time, automatically add new user profile features to the user profile 130 of the user 150. In illustration, the call handling system 120 can add to the user's user profile 130 various information about the user identified at step 204 which is not already contained in the user's user profile 130, such as speech traits and other information identified at step 204. Thus, the user profile 130 can indicate speech traits and other information of the user.

In the case that one or more existing user profile features and one or more new user profile features are mutually exclusive, the call handling system 120 can remove or inactivate such existing user profile features. By way of example, if an existing user profile feature generated during a previous call indicates that the user's sentiment reflected frustration, but the new user feature profile indicates that on the present call the user's sentiment reflects contentment, the existing user profile can be removed or deactivated. In this regard, each time a user interacts with the IVR system 110, additional user profile features may be identified and added to the user profile 130 of the user 150.

At step 216, the custom agent manager 124 can, in real time, automatically update the user's VIVR agent 136 based on the user profile features contained in the user's user profile 130 to customize the user's VIVR agent 136 for user 150 and the present call. In this regard, the user's VIVR agent 136 can be customized to include VIVR agent features 134 that result in TTS engine 122 providing synthesized speech having characteristics that are tailored to the user 150 and the user's sentiments on the present call. In illustration, the user's VIVR agent 136 can be customized to present a speech personality matching the user's personality traits and speech patterns, and appropriate for the user's current sentiment. For example, if the user is female, the user's VIVR agent 136 can be updated to present a female voice that sounds like the user, including language nuances matching the user's voice (e.g., accents, use of colloquial terminology, speech tempo, etc.). Further, if the user's voice expresses a particular sentiment, the user's VIVR agent 136 can be updated to produce speech appropriate for the user's sentiment. For example, if the user's sentiment is anger or frustration, the user's VIVR agent 136 can be updated with VIVR agent features 134 that produce synthesized speech that sounds sympathetic. If the user's sentiment is sadness, the user's VIVR agent 136 can be updated with VIVR agent features 134 that produce synthesized speech that sounds empathetic. Customization of the user's VIVR agent 136 is described in further detail with reference to FIG. 4.

It should be noted that step 216 may follow the creation of the VIVR agent 136 for the user 150 at step 210. In such case, the VIVR agent 136 initially may include, or identify, VIVR agent features 134 specified by the selected baseline VIVR agent profile 132. Step 216 can be implemented to specifically configure the user's VIVR agent 136 for that user 150 and the present call. In the case that step 216 follows step 214, the user's VIVR agent 136 may already be customized for that user 150, but not yet customized for the present call. In such case, step 216 can be implemented to customize the user's VIVR agent 136 for the present call.

At step 218 the call handling system 120 can automatically interact with the user on the call using the user's VIVR agent 136 which has been tailored for the user and the present call. In illustration, the call handling system 120 can indicate to the TTS engine 122 to use the user's VIVR agent 136 to perform linguistic analysis when performing speech synthesis for the call.

The call handling system 120 also can select TTS content 138 to be processed by the TTS engine 122 to generate the speech signals based on various user responses and/or inputs received by the call handling system 120. For example, responsive to receiving a response and/or input from the user 150, the call handling system 120 can access a menu indicating appropriate TTS content 138 for various user responses and/or inputs, and select appropriate TTS content 138 corresponding to the particular response and/or input received from the user 150. The call handling system 120 can indicate to the TTS engine 122 the TTS content 138 that is selected. The selected TTS content 138 can include different texts, each assigned to a different class, that correspond to the particular response and/or input received from the user 150, but are configured with different words, phrases, sentences, colloquialisms, and/or the like structured for different types of users 150-154. The different texts can convey the same meaning, but convey that meaning in different manners.

In response to receiving the indication from the call handling system 120 indicating the selected TTS content 138, the TTS engine 122 can identify a VIVR agent feature 134 contained in the user's VIVR agent 136 that indicates a class of text to be used for generating speech for the user 150. The TTS engine 122 can select from the indicated TTS content 138 the text corresponding to the class indicated by the VIVR agent 136, and perform speech synthesis using that text as input text. Accordingly, the synthesized speech presented to the user 150 can be presented in a form most likely to be understood by the user 150. At this point it should be noted that a particular text may be assigned to one or more classes of text. For example, text for simple prompts (e.g., "please say yes or no") may be assigned to all classes of text. Text for more complicated information, for example lengthy instructions, may be assigned to fewer than all classes of text.

At step 220, the call handling system 120 can continue to monitor, automatically and in real time, utterances spoken by the user 150 during the call and analyze the spoken utterances to evaluate the interaction of the user 150 with the call handling system 120. Based on the analysis, the call handling system 120 can, in real time, update the user's user profile 130 to add, remove and/or update user profile features. For example, if the user provides responses and/or inputs indicating that the user 150 is having difficulty understanding the speech provided by the TTS engine 122 during the call, the call handling system 120 can identify the type of speech the user 150 is having difficulty understanding and add corresponding data to the user's user profile 130 as user profile features. Such data can be processed by the custom agent manager 124 the next time the custom agent manager 124 updates the user's VIVR agent 136. In one arrangement, responsive to the call handling system 120 updating the user's user profile 130 to add, remove and/or update user profile features, the custom agent manager 124 can, in real time, dynamically update the user's VIVR agent 136 to add and/or remove VIVR agent features 134 corresponding to the added, removed and/or updated user profile features. Accordingly, the changes to the VIVR agent 136 can be applied, in real time, to the present call, which may result in an improved call experience for the user.

The call handling system 120 also can collect feedback for new or updated VIVR agent features 134. Continuing with the previous example, if a significant number of users are having difficulty understanding certain TTS generated speech, the feedback collected over various calls can be analyzed by an administrator or engineer to modify existing VIVR agent features 134, remove existing VIVR agent features 134 from baseline VIVR agent profiles 132 and/or VIVR agents 136 and/or add new VIVR agent features 134 to baseline VIVR agent profiles 132 and/or VIVR agents 136. Moreover, the user interaction analytics can identify VIVR agent features 134 shown to be more effective in satisfying users 150-154, for example based on positive feedback from users 150-154, and the administrator or engineer can consider configuring those VIVR agent features 134 to be applied more broadly or frequently to various user VIVR agents 136.

In one arrangement, the analysis of the interaction of the user 150 with the call handling system 120 can indicate that the user is not satisfied with the speech generated by the TTS engine 122. Responsive to detecting such an indication, the call handling system 120 can, in real time, dynamically instruct the custom agent manager 124 to update the user's VIVR agent 136 to add and/or remove VIVR agent features 134, for example VIVR agent features 134 that change the tempo of generated speech, change the accent of generated speech, etc. In illustration, the analysis can indicate that the user speaks at a tempo that is different than a tempo of the TTS generated speech. Accordingly, the custom agent manager 124 can select a VIVR agent feature 134 matching the user's current speech tempo and add that VIVR agent feature 134 to the user's VIVR agent 136 in real time. The call handling system 120 also can determine, in real time, different text is to be selected for speech synthesis to use a different language, dialect and/or different colloquialisms. Similarly, if the analysis indicates that the user's sentiment is becoming more negative, the call handling system 120 can dynamically instruct, in real time, the custom agent manager 124 to update the user's VIVR agent 136 to add and/or remove VIVR agent features 134 to generate speech indicating more empathy toward the user 150, which can serve to create a more positive call experience for the user 150. The call handling system 120 can update the user's user profile 130 accordingly.

In another aspect of the present arrangements, responsive to detecting an indication that the user is not satisfied with the speech generated by the TTS engine 122, the call handling system 120 can, in real time, dynamically select a new VIVR agent 136 to use for speech synthesis. For example, the call handling system 120 can select a default VIVR agent 136, and instruct the TTS engine 122 to use the default VIVR agent 136 for speech synthesis. Again, the call handling system 120 can update the user's user profile 130 accordingly with additional user profile features.

In a further aspect, responsive to detecting an indication that the user is not satisfied with the speech generated by the TTS engine 122, the call handling system 120 can automatically determine whether the call should be transferred to a live agent. Responsive to making such determination, the call handling system 120 can, in real time, transfer the call to a live agent and cease interacting directly with the user 150 on the call. At any time, the live agent can return the call back to the call handling system 120, and the call handling system 120 can again commence interacting with the user 150 on the call.

In one arrangement, based on the analysis performed by the call handling system 120, the call handling system can identify a live agent having personality traits having a high level of suitability for communicating with the user 150 on the call. For example, the call handling system 120 can access data indicating currently available live agents and, for each of the live agents, gender of the live agent, the dialect and/or accent used by the live agent when speaking, the historical effectiveness of the live agent at resolving user issues, various personality traits of the live agents, etc. If the user 150 is a male who speaks using a particular dialect and/or accent expresses a certain sentiment, the call handling system can select a live agent who is male, speaks using that particular dialect and/or accent, and has personality traits known to be effective when dealing with users exhibiting the sentiment of the user 150. The call handling system 120 can transfer the call to that live agent. Doing so can increase the likelihood that the interaction with the user 150 will be effective at providing a positive call experience for the user 150 and reaching a solution to the user's issue.

Responsive to the call being transferred to the live agent, the call handling system 120 can present to the live agent the personality assessment dashboard 126, for example on a computer screen. The live agent can interact with the personality assessment dashboard 126 to select various VIVR agent features 134 and save the selected VIVR agent features 134 to the user's VIVR agent 136. The live agent also can remove certain VIVR agent features 134 from the user's VIVR agent 136. In illustration, the live agent can change VIVR agent features 134 that provide certain speech characteristics in the TTS generated speech.

Moreover, at any time, an administrator or live agent can access the personality assessment dashboard 126 to make changes to the user's VIVR agent 136. For example, an administrator can review logs maintained for various different call sessions with the user 150, for example calls which were transferred to live agents, and proactively make changes to the user's VIVR agent 136 to add and/or delete various VIVR agent features 134. Moreover, the administrator can update the user's user profile 130 to make certain VIVR agent features 134 unavailable for use in the user's VIVR agent 136, make certain baseline VIVR agent profiles 132 unavailable for use in generating new VIVR agents 136 for the user, change call routing rules for the user 150, prevent the call routing rules for the user 150 from being changed, etc.

FIG. 3 is a flow chart illustrating an example of a method 300 of creating a VIVR agent individually configured for the user. At step 302, the custom agent manager 124 can access the user profile 130 (created at step 210 of FIG. 2) and identify the user profile features contained in the user profile 130 of the user 150.

At step 304, the custom agent manager 124 can determine average user profile features for each of a plurality of various user groups to which respective baseline VIVR agent profiles 132 correspond. A particular user group may be defined to include users based on a particular geographic location and macro demographic indicators, while remaining neutral to the extent possible regarding certain personality traits. To determine the average user profile features, the custom agent manager 124 can calculate the average user profile features from the user profiles 130 of users in the user group or access previously calculated data indicating the average user profile features.

At step 306, the custom agent manager 124 can compare the user profile features contained in the user profile 130 of the user 150 to the determined average user profile features for each of the plurality of user groups. At step 308, the custom agent manager 124 can, based on the comparing, identify the user group for which the determined average user profile features most closely correspond to the user profile features contained in the user profile 130 of the user 150. At step 310, the custom agent manager 124 can select from among a plurality of baseline VIVR agent profiles 132 a baseline VIVR agent profile 132 corresponding to the identified user group. At step 312, the custom agent manager 124 can create a VIVR agent 136 for the user 150 using the selected baseline VIVR agent profile 132.

In another arrangement, rather than performing steps 304-310, the custom agent manager 124 can compare the user profile features contained in the user's user profile 130 to a plurality of baseline VIVR agent profiles 132. The custom agent manager 124 can identify from among the plurality of baseline VIVR agent profiles 132 the baseline VIVR agent profile 132 to which the user profile features most closely correspond, and select that baseline VIVR agent profile 132.

At step 312, the custom agent manager 124 can create a VIVR agent 136 for the user 150 using the selected baseline VIVR agent profile 132. For example, the custom agent manager 124 can copy the selected baseline VIVR agent profile 132 and add to the copy at least one user identifier for the user 150 and various other user data obtained from the user 150 to create the VIVR agent 136. The user identifier can indicate that the newly created VIVR agent 136 is assigned to the user 150. As noted, the VIVR agent 136 can be customized, as described with reference to step 216 of FIG. 2 and steps 402-406 of FIG. 4.

In one arrangement, in lieu of automatically selecting the baseline VIVR agent profile 132 based on the user's user profile 130, the IVR system 110 can present to the user 150 the customer dashboard 128, for example via the client device 140 or another client device the user may choose to use. The user 150 can interact with the customer dashboard 128 to select a baseline VIVR agent profile 132. Accordingly, the custom agent manager 124 can create a new VIVR agent 136 for the user 150 using the selected baseline VIVR agent profile 132. Further, the user can interact with the customer dashboard 128 to add, remove or change various VIVR agent features 134 of the VIVR agent 136. In another arrangement, the user 150 can create a new VIVR agent 136 from scratch, not using a baseline VIVR agent profile 132, and customize the VIVR agent 136 as the user 150 so desires.

The custom agent manager 124 can collect and analyze data pertaining to VIVR agent features 134 selected by various users 150-154. Based on such analysis, the custom agent manager 124 can learn how different users select different VIVR agent features 134. From time to time, the custom agent manager 124 can automatically update one or more baseline VIVR agent profiles 132 to implement VIVR agent features 134 popularly selected by users who belong to respective user groups the baseline VIVR agent profiles 132 are intended to serve.

In one aspect of the present arrangements, a user 150 can have a plurality of VIVR agents 136. The customer dashboard 128 can present to the user 150 with a history of the user's VIVR agents 136 previously used by the IVR system 110 for the user's calls. At any time the user 150 can select which of the user's VIVR agent 136 is to be used by the IVR system 110 for new user calls to the IVR system 110 by the user 150. In another aspect, during initial interaction with the user 150 (step 204 of FIG. 2), the call handling system 120 can prompt the user 150 to select which of the user's VIVR agents 136 are to be used by the IVR system 110 on the present call. The TTS engine 122 can use the selected VIVR agent 136 while performing speech synthesis for the call. Accordingly, the user 150 can customize the call experience for the present mood of the user 150 and/or to use the VIVR agent 136 the user enjoys most.

Further, using the customer dashboard 128, the user 150 can select one or more available call routing rules to be applied to calls from the user 150. For example, if the user 150 may frequently call the IVR system 110 for a particular type of issue, the user can select a call routing rule that routes the calls directly to a particular menu of the call handling system 120. Such selection can be saved to the user profile 130 of the user 150. Responsive to receiving a call from the user 150 and identifying the user 150, the IVR system 110 can route the call to that particular menu.

FIG. 4 is a flow chart illustrating an example of a method 400 of customizing a VIVR agent individually configured for the user. At step 402, the custom agent manager 124 can access the user profile 130 of the user 150 and identify the user profile features contained in the user profile 130.

At step 404, the custom agent manager 124 can identify VIVR agent features 134 best corresponding to the user profile features, such as speech traits and other information of the user 150. Such VIVR agent features 134 can be considered to be best if the VIVR agent features 134 specify parameters having a higher level of correlation to the user profile features than the same types of parameters specified by other VIVR agent features 134. By way of example, a user profile feature can indicate the user's tempo of speech. Various VIVR agent features 134 can specify different tempos of speech. The custom agent manager 124 can identify the VIVR agent feature 134 that specifies a tempo of speech closest to the tempo of speech indicated by the user profile feature as best corresponding to the user profile feature. In another example, a user profile feature can indicate the user's sentiment. Various VIVR agent features 134 can specify voice inflection parameters, and include metadata indicating user sentiments (e.g., anger, frustration, sadness, joy, confusion, etc.) for which the voice inflection parameters are intended to address. The custom agent manager 124 can identify the VIVR agent feature 134 that includes metadata most closely matching the user's sentiment indicated by the user profile feature. These are only examples presented to facilitate understanding of the present arrangements, and the present arrangements are not limited to these examples.

At step 406, the custom agent manager 124 can update the user's VIVR agent 136 by adding to the VIVR agent 136 the identified VIVR agent features 134 best corresponding to the user profile features. In addition to adding VIVR agent features 134 to the VIVR agent 136, the custom agent manager 124 also can remove VIVR agent features 134 from the user's VIVR agent 136. The added VIVR agent features 134 can correspond to added or updated user profile features. Similarly, the removed VIVR agent features 134 can correspond to removed or updated user profile features. For example, if the analytics data indicates that the user's sentiment is one of anger during the initial interaction with the call handling system 120, the custom agent manager 124 can identify VIVR agent features 134 that are not suitable for use in generating synthesized speech for the present call, such as VIVR agent features 134 that contribute to a generated voice having joyful characteristics, and remove those VIVR agent features 134 from the user's VIVR agent 136. Further, the custom agent manager 124 can identify VIVR agent features 134 that are suitable for use in generating synthesized speech for the present call, and add those VIVR agent features 134 to the user's VIVR agent 136. Again, this is but one example to facilitate understanding of the present arrangements, and the present arrangements are not limited to this example.

Figure 5:
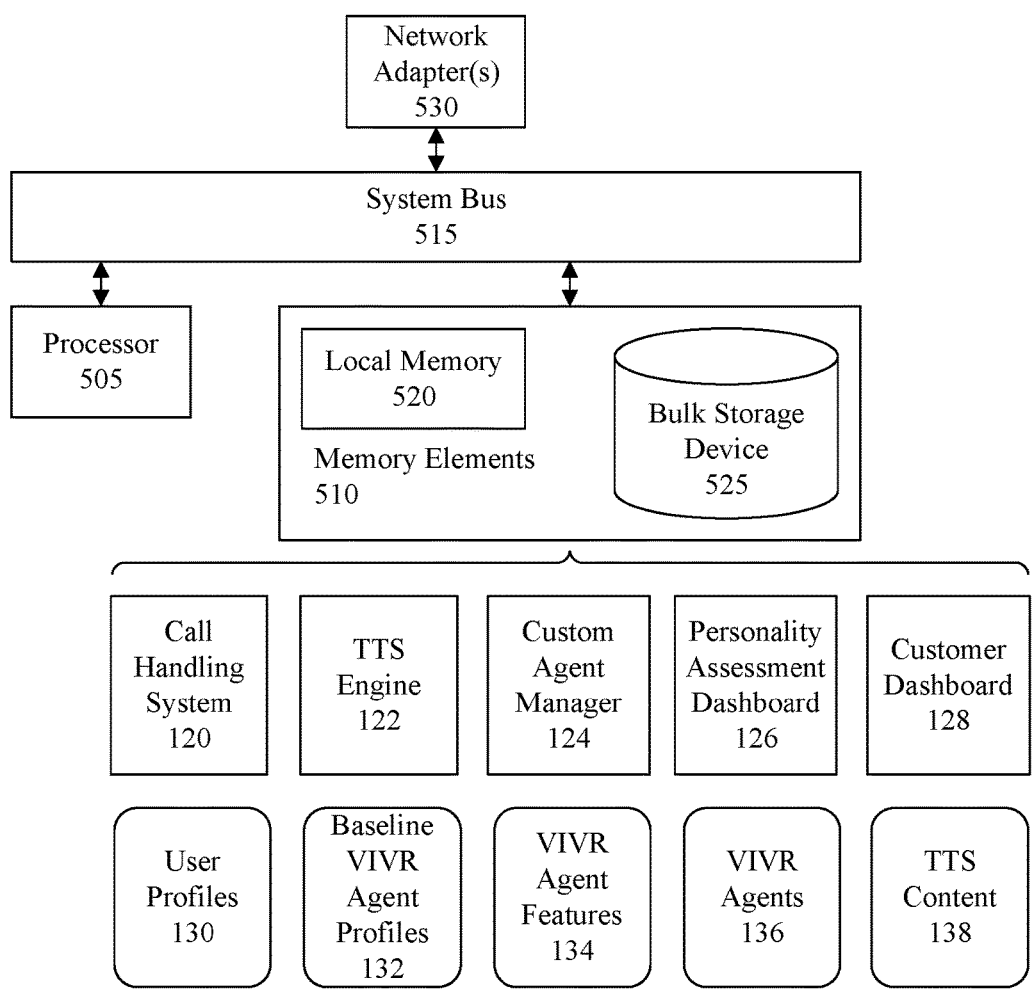
FIG. 5 is a block diagram illustrating example architecture for an interactive voice response (IVR) system.

FIG. 5 is a block diagram illustrating example architecture for the IVR system 110 of FIG. 1. The IVR system 110 can include at least one processor 505 (e.g., a central processing unit) coupled to memory elements 510 through a system bus 515 or other suitable circuitry. As such, the IVR system 110 can store program code within the memory elements 510. The processor 505 can execute the program code accessed from the memory elements 510 via the system bus 515. It should be appreciated that the IVR system 110 can be implemented in the form of any system including a processor and memory that is capable of performing the functions and/or operations described within this specification. For example, the IVR system 110 can be implemented as a server, a plurality of communicatively linked servers, or the like.

The memory elements 510 can include one or more physical memory devices such as, for example, local memory 520 and one or more bulk storage devices 525. Local memory 520 refers to random access memory (RAM) or other non-persistent memory device(s) generally used during actual execution of the program code. The bulk storage device(s) 525 can be implemented as a hard disk drive (HDD), solid state drive (SSD), or other persistent data storage device. The IVR system 110 also can include one or more cache memories (not shown) that provide temporary storage of at least some program code in order to reduce the number of times program code must be retrieved from the bulk storage device 525 during execution.

One or more network adapters 530 can be coupled to IVR system 110 to enable the IVR system 110 to become coupled to client devices (e.g., client devices 140-144 of FIG. 1), remote storage devices, other systems, remote printers, and the like through intervening private or public networks. Modems, cable modems, transceivers, and Ethernet cards are examples of different types of network adapters 530 that can be used with the IVR system 110.

As pictured in FIG. 5, the memory elements 510 can store the components of the IVR system 110 of FIG. 1, namely the call handling system 120, the TTS engine 122, the custom agent manager 124, the personality assessment dashboard 126, the customer dashboard 128, the user profiles 130, the baseline VIVR agent profiles 132, the VIVR agent features 134, the VIVR agents 136 and the TTS content 138. Being implemented in the form of executable program code, the call handling system 120, TTS engine 122, custom agent manager 124, personality assessment dashboard 126 and customer dashboard 128 can be executed by the IVR system 110 and, as such, can be considered part of the IVR system 110. Further, the user profiles 130, baseline VIVR agent profiles 132, VIVR agent features 134, VIVR agents 136 and TTS content 138 can be processed by the IVR system 110 and, as such, also can be considered part of the IVR system 110. Moreover, the call handling system 120, TTS engine 122, custom agent manager 124, personality assessment dashboard 126, customer dashboard 128, user profiles 130, baseline VIVR agent profiles 132, VIVR agent features 134, VIVR agents 136 and TTS content 138 are functional data structures that impart functionality when employed as part of the IVR system 110.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving a first call from a user;
    receiving at least a first input from the user on the first call;
    responsive to receiving at least the first input from the user on the first call, identifying or creating a user profile for the user, the user profile indicating at least a first speech trait of the user;
    responsive to identifying or creating the user profile for the user, automatically identifying or creating, using a processor, a virtual intelligent voice response (VIVR) agent individually configured for the user, the VIVR agent configured to include, or identify, at least a first VIVR agent feature corresponding to at least a first speech trait of the user; and
    interacting with the user on the first call by generating first synthesized speech using the VIVR agent individually configured for the user to perform linguistic analysis when generating the first synthesized speech, using the VIVR agent individually configured for the user to perform the linguistic analysis comprising using parameters specified by at least the first VIVR agent feature included in, or identified by, the VIVR agent individually configured for the user.

2. The method of claim 1, further comprising:
    responsive to receiving at least the first input received from the user on the first call, identifying at least the first speech trait of the user; and
    responsive to identifying at least the first speech trait of the user, updating the VIVR agent to include at least the first VIVR agent feature corresponding to at least the first speech trait of the user.

3. The method of claim 1, further comprising:
    receiving at least a second call from the user;
    responsive to receiving the second call from the user, identifying the VIVR agent individually configured for the user;
    receiving at least a second input received from the user on the second call;
    responsive to receiving at least the second input received from the user on the second call, identifying at least a second speech trait of the user;
    responsive to identifying at least the second speech trait of the user, updating the VIVR agent to include at least a second VIVR agent feature corresponding to at least the second speech trait of the user; and
    interacting with the user on the second call by generating second synthesized speech using parameters specified by at least the second VIVR agent feature included in, or identified by, the VIVR agent individually configured for the user.

4. The method of claim 1, wherein creating the VIVR agent individually configured for the user comprises:
    identifying user profile features contained in the user profile of the user;
    determining average user profile features for each of a plurality of user groups;
    comparing the user profile features contained in the user profile of the user to the determined average user profile features of each of the plurality of user groups;
    based on the comparing, identifying a user group from among the plurality of user groups for which the determined average user profile features most closely correspond to the user profile features contained in the user profile of the user;
    selecting from among a plurality of baseline VIVR agent profiles a baseline VIVR agent profile corresponding to the identified user group; and
    creating the VIVR agent individually configured for the user using the selected baseline VIVR agent profile corresponding to the identified user group.

5. The method of claim 1, wherein creating the VIVR agent individually configured for the user comprises:
    identifying user profile features contained in the user profile of the user;
    selecting from among a plurality of baseline VIVR agent profiles a baseline VIVR agent profile to which the user profile features most closely correspond; and
    creating the VIVR agent individually configured for the user using the selected baseline VIVR agent profile to which the user profile features most closely correspond.

6. The method of claim 1, further comprising:
    monitoring utterances spoken by the user during the first call;

analyzing the utterances spoken by the user during the first call; and based on analyzing the utterances spoken by the user during the first call, updating, in real time, the user profile of the user to add, remove or update user profile features contained in the user profile.

7. The method of claim 6, further comprising:

dynamically updating, in real time, the VIVR agent individually configured for the user to add or remove VIVR agent features corresponding to the added, removed or updated user profile features contained in the user profile.

8. A system, comprising:

a processor programmed to initiate executable operations comprising:

receiving a first call from a user;

receiving at least a first input from the user on the first call;

responsive to receiving at least the first input from the user on the first call, identifying or creating a user profile for the user, the user profile indicating at least a first speech trait of the user;

responsive to identifying or creating the user profile for the user, automatically identifying or creating a virtual intelligent voice response (VIVR) agent individually configured for the user, the VIVR agent configured to include, or identify, at least a first VIVR agent feature corresponding to at least a first speech trait of the user; and interacting with the user on the first call by generating first synthesized speech using the VIVR agent individually configured for the user to perform linguistic analysis when generating the first synthesized speech, using the VIVR agent individually configured for the user to perform the linguistic analysis comprising using parameters specified by at least the first VIVR agent feature included in, or identified by, the VIVR agent individually configured for the user.

9. The system of claim 8, the executable operations further comprising:

responsive to receiving at least the first input received from the user on the first call, identifying at least the first speech trait of the user; and responsive to identifying at least the first speech trait of the user, updating the VIVR agent to include at least the first VIVR agent feature corresponding to at least the first speech trait of the user.

10. The system of claim 8, the executable operations further comprising:

receiving at least a second call from the user;

responsive to receiving the second call from the user, identifying the VIVR agent individually configured for the user;

receiving at least a second input received from the user on the second call;

responsive to receiving at least the second input received from the user on the second call, identifying at least a second speech trait of the user;

responsive to identifying at least the second speech trait of the user, updating the VIVR agent to include at least a second VIVR agent feature corresponding to at least the second speech trait of the user; and interacting with the user on the second call by generating second synthesized speech using parameters specified by at least the second VIVR agent feature included in, or identified by, the VIVR agent individually configured for the user.

11. The system of claim 8, wherein creating the VIVR agent individually configured for the user comprises:

identifying user profile features contained in the user profile of the user;

determining average user profile features for each of a plurality of user groups;

comparing the user profile features contained in the user profile of the user to the determined average user profile features of each of the plurality of user groups;

based on the comparing, identifying a user group from among the plurality of user groups for which the determined average user profile features most closely correspond to the user profile features contained in the user profile of the user;

selecting from among a plurality of baseline VIVR agent profiles a baseline VIVR agent profile corresponding to the identified user group; and creating the VIVR agent individually configured for the user using the selected baseline VIVR agent profile corresponding to the identified user group.

12. The system of claim 8, wherein creating the VIVR agent individually configured for the user comprises:

selecting user profile features contained in the user profile of the user;

identifying from among a plurality of baseline VIVR agent profiles a baseline VIVR agent profile to which the user profile features most closely correspond; and creating the VIVR agent individually configured for the user using the selected baseline VIVR agent profile to which the user profile features most closely correspond.

13. The system of claim 8, the executable operations further comprising:

monitoring utterances spoken by the user during the first call;

analyzing the utterances spoken by the user during the first call; and based on analyzing the utterances spoken by the user during the first call, updating, in real time, the user profile of the user to add, remove or update user profile features contained in the user profile.

14. The system of claim 13, the executable operations further comprising:

dynamically updating, in real time, the VIVR agent individually configured for the user to add or remove VIVR agent features corresponding to the added, removed or updated user profile features contained in the user profile.

15. A computer program product comprising a computer readable storage medium having program code stored thereon, the program code executable by a processor to perform a method comprising:

receiving, by the processor, a first call from a user;

receiving, by the processor, at least a first input from the user on the first call;

responsive to receiving at least the first input from the user on the first call, identifying or creating, by the processor, a user profile for the user, the user profile indicating at least a first speech trait of the user;

responsive to identifying or creating the user profile for the user, automatically identifying or creating, by the processor, a virtual intelligent voice response (VIVR) agent individually configured for the user, the VIVR agent configured to include, or identify, at least a first VIVR agent feature corresponding to at least a first speech trait of the user; and interacting, by the processor, with the user on the first call by generating first synthesized speech using the VIVR agent individually configured for the user to perform linguistic analysis when generating the first synthesized speech, using the VIVR agent individually configured for the user to perform the linguistic analysis comprising using parameters specified by at least the first VIVR agent feature included in, or identified by, the VIVR agent individually configured for the user.

16. The computer program product of claim 15, the method further comprising:
responsive to receiving at least the first input received from the user on the first call, identifying at least the first speech trait of the user; and
responsive to identifying at least the first speech trait of the user, updating the VIVR agent to include at least the first VIVR agent feature corresponding to at least the first speech trait of the user.

17. The computer program product of claim 15, the method further comprising:
receiving at least a second call from the user;
responsive to receiving the second call from the user, identifying the VIVR agent individually configured for the user;
receiving at least a second input received from the user on the second call;
responsive to receiving at least the second input received from the user on the second call, identifying at least a second speech trait of the user;
responsive to identifying at least the second speech trait of the user, updating the VIVR agent to include at least a second VIVR agent feature corresponding to at least the second speech trait of the user; and
interacting with the user on the second call by generating second synthesized speech using parameters specified by at least the second VIVR agent feature included in, or identified by, the VIVR agent individually configured for the user.

18. The computer program product of claim 15, wherein creating the VIVR agent individually configured for the user comprises:

identifying user profile features contained in the user profile of the user;
determining average user profile features for each of a plurality of user groups;
comparing the user profile features contained in the user profile of the user to the determined average user profile features of each of the plurality of user groups;
based on the comparing, identifying a user group from among the plurality of user groups for which the determined average user profile features most closely correspond to the user profile features contained in the user profile of the user;
selecting from among a plurality of baseline VIVR agent profiles a baseline VIVR agent profile corresponding to the identified user group; and
creating the VIVR agent individually configured for the user using the selected baseline VIVR agent profile corresponding to the identified user group.

19. The computer program product of claim 15, wherein creating the VIVR agent individually configured for the user comprises:
identifying user profile features contained in the user profile of the user;
selecting from among a plurality of baseline VIVR agent profiles a baseline VIVR agent profile to which the user profile features most closely correspond; and
creating the VIVR agent individually configured for the user using the selected baseline VIVR agent profile to which the user profile features most closely correspond.

20. The computer program product of claim 15, the method further comprising:
monitoring utterances spoken by the user during the first call;
analyzing the utterances spoken by the user during the first call; and
based on analyzing the utterances spoken by the user during the first call, updating, in real time, the user profile of the user to add, remove or update user profile features contained in the user profile.

* * * * *